US008812947B1

(12) United States Patent
Maoz et al.

(10) Patent No.: US 8,812,947 B1
(45) Date of Patent: Aug. 19, 2014

(54) RANKING GRAPHICAL VISUALIZATIONS OF A DATA SET ACCORDING TO DATA ATTRIBUTES

(75) Inventors: Hillel Maoz, Petah Tikva (IL); Daniel Libicki, Jerusalem (IL); Michael Fink, Jerusalem (IL); Ronald Ho, Fremont, CA (US); Dennis Julian Lee, New York, NY (US); Yossi Matias, Tel-Aviv (IL); Amit Weinstein, Tel-Aviv (IL); Yoah Bar David, Kfar Hes (IL); Itai Raz, Palo-Alto, CA (US)

(73) Assignee: Google Inc., Mountain View, CA (US)

( * ) Notice: Subject to any disclaimer, the term of this patent is extended or adjusted under 35 U.S.C. 154(b) by 348 days.

(21) Appl. No.: 13/314,780

(22) Filed: Dec. 8, 2011

(51) Int. Cl.
  *G06F 17/24* (2006.01)
  *G06F 17/30* (2006.01)
(52) U.S. Cl.
  CPC .................... *G06F 17/246* (2013.01)
  USPC .......................... 715/212; 715/215
(58) Field of Classification Search
  CPC .... G06F 17/246; G06F 17/211; G06F 17/245
  USPC ................. 715/212, 215
  See application file for complete search history.

(56) References Cited

U.S. PATENT DOCUMENTS

| | | | |
|---|---|---|---|
| 5,461,708 A | 10/1995 | Kahn | |
| 5,550,964 A | 8/1996 | Davoust | |
| 5,581,678 A | 12/1996 | Kahn | |
| 5,611,034 A | 3/1997 | Makita | |
| 6,523,040 B1* | 2/2003 | Lo et al. ................. | 1/1 |
| 7,002,580 B1 | 2/2006 | Aggala et al. | |
| 7,581,168 B2 | 8/2009 | Boon | |
| 7,705,847 B2 | 4/2010 | Helfman et al. | |
| 7,921,363 B1* | 4/2011 | Hao et al. ................. | 715/273 |
| 8,006,194 B2 | 8/2011 | Berger et al. | |
| 2005/0240615 A1* | 10/2005 | Barsness et al. .......... | 707/102 |
| 2006/0129914 A1* | 6/2006 | Ellis et al. ............... | 715/504 |
| 2009/0006318 A1* | 1/2009 | Lehtipalo et al. ........ | 707/2 |
| 2009/0006319 A1* | 1/2009 | Lehtipalo et al. ........ | 707/2 |
| 2009/0006455 A1* | 1/2009 | Carroll ..................... | 707/102 |
| 2009/0007010 A1* | 1/2009 | Kriss et al. ............... | 715/810 |
| 2009/0287673 A1 | 11/2009 | Chronister et al. | |
| 2010/0005008 A1* | 1/2010 | Duncker et al. .......... | 705/27 |
| 2010/0169137 A1* | 7/2010 | Jastrebski et al. ........ | 705/7 |
| 2011/0302194 A1* | 12/2011 | Gonzalez et al. ......... | 707/769 |
| 2012/0089566 A1* | 4/2012 | Effern et al. ............. | 707/611 |
| 2012/0101975 A1* | 4/2012 | Khosravy ................ | 706/55 |

* cited by examiner

*Primary Examiner* — Stephen Hong
*Assistant Examiner* — Ahamed I Nazar
(74) *Attorney, Agent, or Firm* — Young Basile Hanlone & MacFarlane P.C.

(57) ABSTRACT

A computer-implemented system, method and computer readable medium to generate graphical visualizations corresponding to a data set populated in a web-based document, such as a spreadsheet. The spreadsheet is accessible in an interne or cloud-based system, and enables users to automatically create graphical visualizations or representations based on recommendations by a spreadsheet application. The graphical visualizations may be automatically ranked such that the system provides the recommendations to the user for display. Automatic ranking is accomplished, for example, by determining data types from identifying column type, differentiating column types, and extracting data sets having attributes corresponding to various graphical visualizations.

26 Claims, 11 Drawing Sheets

| Oranges (kg) | Salaries ($) | Bananas (kg) | Department | Address |
|---|---|---|---|---|
| 100 | 40 | 150 | A | 1, Ny |
| 200 | 50 | 120 | B | 2, Ny |

| Oranges (kg) | Salaries ($) | Bananas (kg) | Department | Address |
|---|---|---|---|---|
| 100 | 40 | 150 | A | 1, Ny |
| 200 | 50 | 120 | B | 2, Ny |

| Oranges (kg) | Salaries ($) | Bananas (kg) | Department | |
|---|---|---|---|---|
| 100 | 40 | 150 | A | |
| 200 | 50 | 120 | B | |

| Department | Oranges (kg) | Salaries ($) | Bananas (kg) |
|---|---|---|---|
| A | 100 | 40 | 150 |
| B | 200 | 50 | 120 |

| Department | Oranges (kg) | Bananas (kg) |
|---|---|---|
| A | 100 | 150 |
| B | 200 | 120 |

| Department | Salaries ($) |
|---|---|
| A | 40 |
| B | 50 |

RANKING GRAPHICAL VISUALIZATIONS OF A DATA SET ACCORDING TO DATA ATTRIBUTES

TECHNICAL FIELD

The present disclosure relates to the field of graphical visualizations for a data set, and in particular, to generating graphical visualizations from a data set in a web-based document, such as a spreadsheet.

BACKGROUND

In internet-based or cloud-based computing, documents and applications may be managed or executed using web browsers. In such an environment, information for the documents or applications to be managed or executed is typically obtained from a remote server system or service. Such documents and applications may include, for example, search engines, map services and spreadsheet programs which operate by loading executable HTML and JavaScript code from the server system to a browser running on a client device remote from the server system. The interne or cloud-based computing environment also allows clients the ability to access documents from different computers and locations.

As mentioned, one particular type of document is an electronic spreadsheet application. Spreadsheet applications allow users to input structured data or data models into a spreadsheet that arranges the data in rows and columns defining the spreadsheet cell. Spreadsheets (or worksheets) can enable a user to establish formulas and other relationships between and among the cells that make up the spreadsheet so as to compute a variety of values. The content or data of a spreadsheet can be viewed on a screen or any medium capable of displaying or otherwise indicating the contents contained therein. One such method of displaying the contents or data of the spreadsheet is by using graphical representations or visualizations, for example line graphs, maps, pie charts, tree structures, organizational charts, bar graphs, trends or any other known type of graphical representation or visualization.

SUMMARY

The present disclosure relates to the field of graphical visualizations for a data set, and in particular, to generating graphical visualizations from a data set in a web-based document, such as a spreadsheet.

In one embodiment, there is a computer-implemented method to generate a graphical visualization in a web-based document application, including identifying a data type for each column in a data table having a first set of data; differentiating the data types between each of the columns in the data table; determining a second data set derived from the first data set and corresponding to at least one graphical visualization in a plurality of graphical visualizations; selecting a set of graphical visualizations comprised of each graphical visualization having attributes suitable for the second data set; ranking each graphical visualization in the set of graphical visualizations to graphically represent the second data set; and generating at least one graphical visualization from the set of graphical visualizations for display based on the ranking.

In one aspect, the identification of the data type is determined by analyzing information from each of the columns in the data table, the extracted information including at least one of primitive types of column values, column labels, value formatting, known values and customized properties.

In another aspect, the method further includes determining each of the second data sets by: removing at least one of the columns in the data table based on the differentiated data types, rearranging at least one of the columns to correspond with a respective graphical visualization in the set of graphical visualizations, and partitioning the columns in the data table to form partitioned second data sets, each set having columns with similar data types; and examining the partitioned second data sets to determine respective data structures.

In still another aspect, the method further includes determining whether each graphical visualization in the set of graphical visualizations corresponds to the data structure; selecting each graphical visualization in the set of graphical visualizations that is representative of the data structure; and discarding each graphical visualization in the set of graphical visualizations that is not representative of the data structure.

In yet another aspect, the method further includes applying criteria to determine at least one of the compatibility and aesthetic attractiveness of each selected graphical visualization to a range of data in the partitioned second data sets; determining a context for each selected graphical visualization in the set of graphical visualizations; and ranking each selected graphical visualization in the set of graphical visualizations according to at least one of the criteria and context.

In another aspect, the context includes at least one of visualization popularity, previously used visualizations, visualization used in a same context, visualizations used for a same data set and visualizations generating insight.

In yet another aspect, the at least one generated graphical visualization is the highest ranking.

In still another aspect, the web-based document application resides on a web-based server that communicates via a network with a client device.

In another aspect, the web-based document and graphical visualizations are displayed on the client device via a web page.

In yet another aspect, the web-based document is populated with the first data set acquired from one of a storage device, the client device and the web-based server.

In still another aspect, the web-based document is a spreadsheet.

In another aspect, the method further includes acquiring the first data set into the data table from a database; examining data from the first data set to determine a data structure; and calculating a number of rows and columns in the data table which includes the first data set.

In another embodiment, there is a non-transitory computer readable medium storing instructions to generate a graphical visualization in a web-based document application, the instructions when executed by a processor, including identifying a data type for each column in a data table having a first set of data; differentiating the data types between each of the columns in the data table; determining a second data set derived from the first data set and corresponding to at least one graphical visualization in a plurality of graphical visualizations; selecting a set of graphical visualizations comprised of each graphical visualization having attributes suitable for the second data set; ranking each graphical visualization in the set of graphical visualizations to graphically represent the second data set; and generating at least one graphical visualization from the set of graphical visualizations for display based on the ranking.

In still another embodiment, there is a computer-implemented server to generate a graphical visualization in a web-based document application, including a memory storing an application; and at least one processor executing the application to: identify a data type for each column in a data table having a first set of data; differentiate the data types between each of the columns in the data table; determine a second data set derived from the first data set and corresponding to at least one graphical visualization in a plurality of graphical visualizations; select a set of graphical visualizations comprised of each graphical visualization having attributes suitable for the second data set; rank each graphical visualization in the set of graphical visualizations to graphically represent the second data set; and generate at least one graphical visualization from the set of graphical visualizations for display based on the ranking.

DETAILED DESCRIPTION

In view of the foregoing, the present disclosure, through one or more of its various aspects, embodiments and/or specific features or sub-components, is thus intended to bring out one or more of the advantages as specifically noted below.

The present disclosure relates to the field of graphical visualizations for a data set, and in particular, to generating graphical visualizations from a data set in a web-based document, for example an electronic spreadsheet, accessible in an interne or cloud-based system. Programs such as spreadsheets enable a user to create graphical visualizations or representations from data or data sets in the spreadsheet. As appreciated, spreadsheets are typically made up of a grid of cells having rows and columns (e.g. data table), and allow users to track and manipulate large amounts of organized and structured information and data. Formulas, as well as other relationships among the cells making up the spreadsheet, can be created to compute various values. In an effort to provide a meaningful and visually appealing rendering of the content in the spreadsheet, the spreadsheet application permits users to generate graphical visualizations or renderings of the content. These graphical visualizations or renderings may be dynamic and/or static representations of the content of the spreadsheet that is generated by the application, and may come in the form of any graphical representations, including, but not limited to line graphs, maps, pie charts, tree structures, organizational charts, bar graphs, trends, motions charts, geographical charts, sparklines, gauges, or any other known type of graphical representation or visualization, explained below in more detail. It is also appreciated that while the exemplary embodiments are with reference to spreadsheets, the invention is not limited to such an embodiment and may use any electronic document to store a data set, as appreciated by the skilled artisan.

Figure 1:
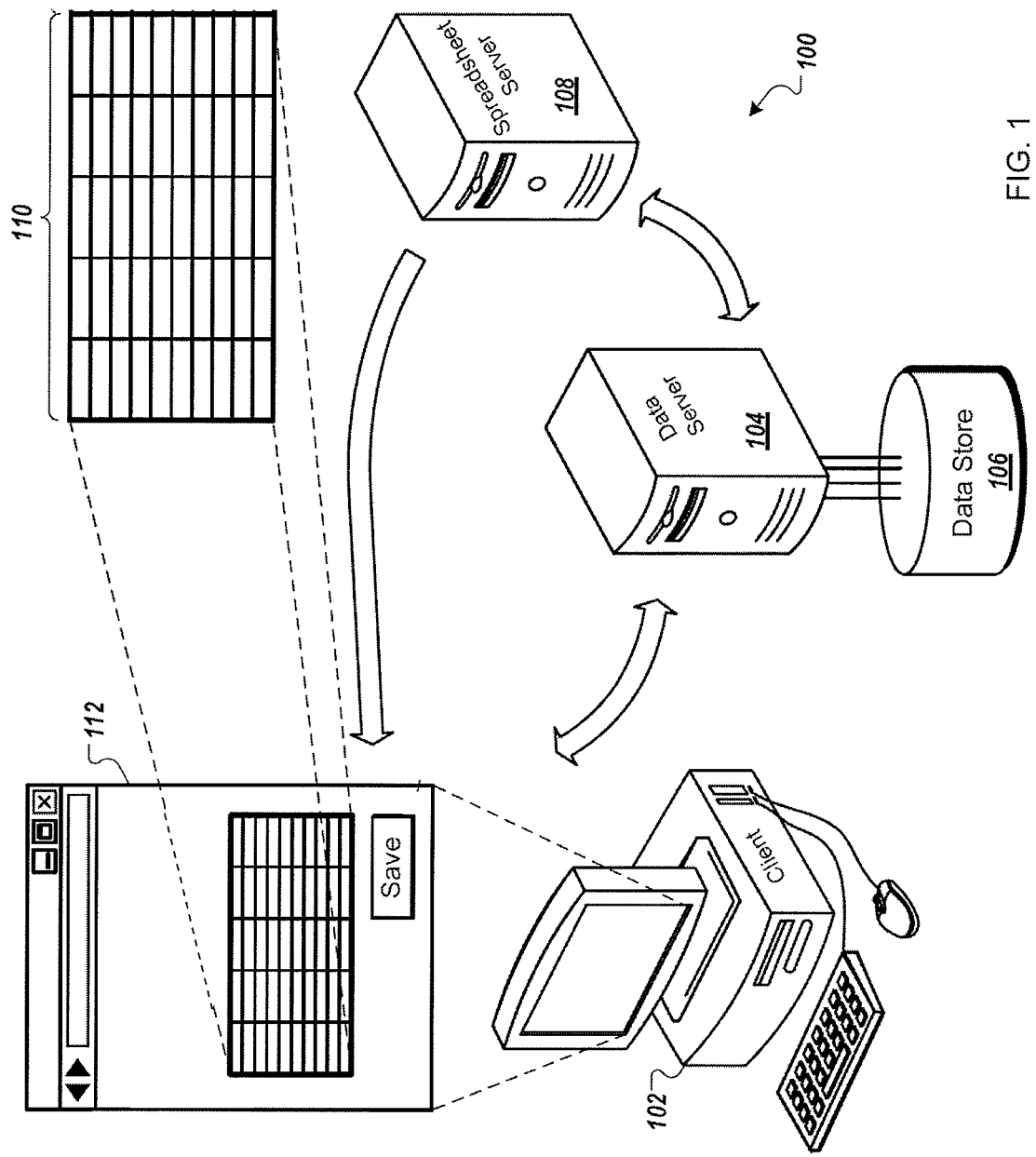
FIG. 1 illustrates an exemplary system in which an electronic document may be accessed in accordance with the present invention.

FIG. 1 illustrates an exemplary system in which an electronic document may be accessed in accordance with the present invention. As illustrated in the exemplary embodiment, system 100 includes a data server 104, data store 106 and spreadsheet server 108 that communicate with a client device 102. The client device 102 in this example may take a variety of forms, such as personal computer, laptop computer, and mobile devices such as personal digital assistants, notebooks, tablets and smart phones. The data server 104 can respond to a user request for info nation by gathering data from the data store 106, providing certain data to the device 102, and providing all or some of the data (either in its original form or a reformatted form) to the spreadsheet server 108, which may in turn insert the data into the document for use by the device 102. Alternatively, data may be directly input into the device 102 by a user accessing the device and saved to the data store 106. It is also appreciated that while the data server 104, data store 106 and data spreadsheet server 108 are illustrated as separate components, each of the components may be formed together as a single component or any combination thereof. Moreover, the invention is not limited to the illustrated components. For purposes of the embodiment, the type of document provided by the system 100 is described as a spreadsheet, although other types of documents can also be provided. Components in the system 100 can also be interconnected by any type of network, such as an intra-net, extra-net, the Internet, etc.

For example, by using a web browser, the client device 102 can load a document 112 from the data server 104 (which may be one or more servers that make up a sub-system, but are shown for clarity here as a single server). The document 112 may include content (e.g., a set of data) supplied by the data server 104, the client device 102 or input directly by the user, where the document 112 is represented in an exploded view by a spreadsheet 110 with visible cells. For example, a user of device 102 may request to see a presentation of a large amount of data relating to their account on an internet service associated with data server 104, or may be a random input of data from the user. As explained above, the spreadsheet server 108 can create a spreadsheet document populated with data provided by the data server 104, the client device 102 or directly by the user. The populated spreadsheet document is then displayed as a spreadsheet in the cells.

Figure 2:
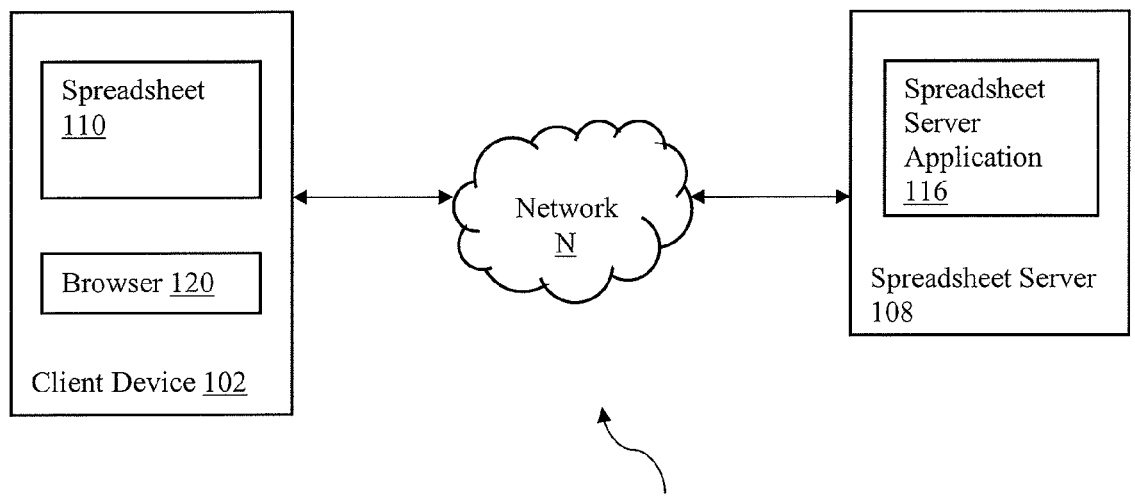
FIG. 2 illustrates another exemplary system in which an electronic document may be accessed in accordance with the present invention.

FIG. 2 illustrates another exemplary system in which an electronic document may be accessed in accordance with the present invention. As illustrated, system 200 includes a client device 102, spreadsheet server 108 and network N, which may be any network, such as the Internet, that interconnects client device 102 and spreadsheet server 108. Although the illustration depicts a single client device 102 and a single spreadsheet server 108, it is appreciated that the invention is not limited to such an embodiment and other computer systems may be connected to or accessible though network N. Client device 102 is any device that can access network N or act as a standalone device, either of which can execute one or more applications running thereon. In accordance with the illustrated embodiment, client device 102 is operative to execute a spreadsheet application 110 and/or browser 120. The spreadsheet server application 116 may be located as a standalone application on client device 102 (not depicted) or accessed through network N and the spreadsheet server 108 via browser 120 and run as a script (illustrated as spreadsheet 110) on the client device 102, or by any other means known in the art. Spreadsheet server 108 may be any computing device that is operative to execute spreadsheet server application 116, as well as communicate via network N with client device 102. Browser 120, as understood by the skilled artisan, allows client device 102 to view web pages over network N using, for example, any web browser. The browser 120 will enable a user of client device 102 to view the spreadsheet 110, as well as graphical visualizations and representations that are generated by the spreadsheet server application 116 residing on spreadsheet server 108 by accessing data sets comprising the spreadsheet 110.

Residing on spreadsheet server 108 is a spreadsheet server application 116. The spreadsheet server application 116 is responsible for analyzing the contents of the spreadsheet 110 and generating and/or recommending graphical visualization (s) in response to the analyzed content. The spreadsheet server application 116, in the exemplary embodiment and as its name suggests, is a server-based application program that may execute independent of other network components. The graphical visualization(s) generated by the spreadsheet server application 116 are stored as visualization data in a format representative of each type of graphical visualization the application server application 116 is capable of rendering. The visualization data may be stored, for example, in data store 106, spreadsheet server 108 or in any other location on the system. It is also appreciated that visualization data may be removed from or added to the system such that different graphical visualizations may be revised, changed or otherwise managed. Once the content in the spreadsheet 110 has been analyzed, the visualization data is automatically generated as a graphical visualization with the analyzed content populated accordingly, as explained in more detail below.

Figure 3:
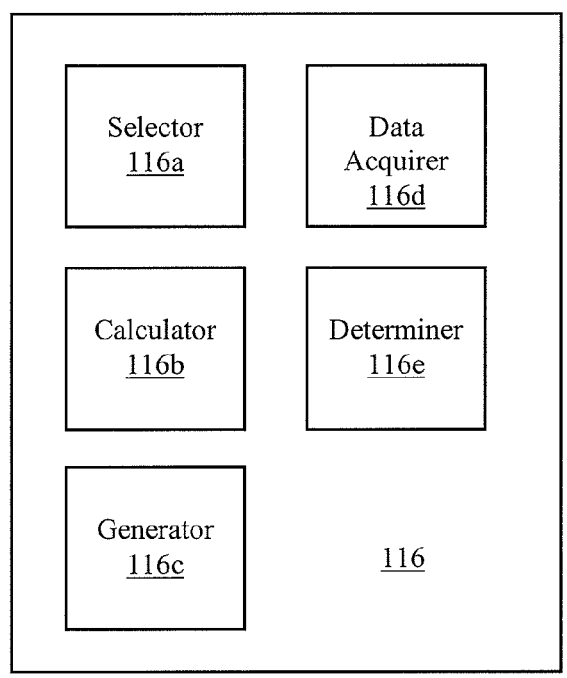
FIG. 3 illustrates an exemplary spreadsheet server application in accordance with FIG. 2 of the present invention.

FIG. 3 illustrates an exemplary spreadsheet server application in accordance with FIG. 2 of the present invention. The exemplary spreadsheet server application 116 includes, for example, a selector 116a, a calculator 116b, a generator 116c, a data acquirer 116d and a determiner 116e. Data acquirer 116d operates to acquire contents (e.g. a data set) for use with spreadsheet 110. Once a data set has been acquired, determiner 116e analyzes (examines) the data set to determine a data structure. Selector 116a operates to select or filter out a set of graphical visualizations from a pool of graphical visualizations after the data structure has been determined, and calculator 116b ranks the set of graphical visualizations according to various rules and/or criteria applied to the data set. After ranking, generator 116c recommends graphical visualization(s) to be generated for display based on the rankings. Although the embodiment disclosed herein shows five components in the spreadsheet server application 116, the invention is not limited to only these components. As appreciated, components may be added, removed and/or combined to operate in a similar manner to the disclosed embodiment. It is also noted again that the spreadsheet server application 116, although depicted as residing on the spreadsheet server 108, may also be located on any device accessible by the system 200.

Figure 4:
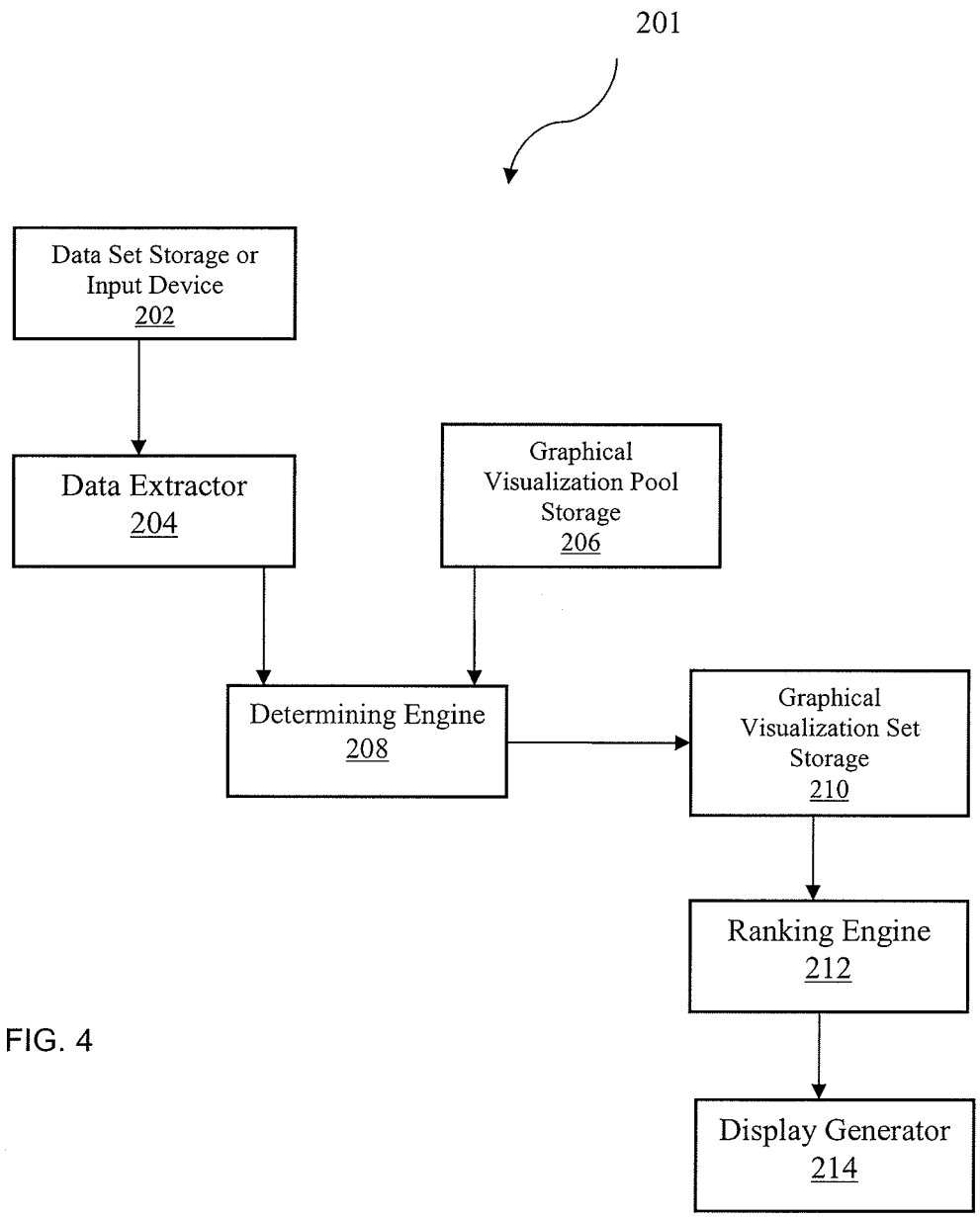
FIG. 4 illustrates an exemplary component diagram of the system in accordance with the represent invention.

FIG. 4 illustrates an exemplary component diagram of the system in accordance with the present invention. Components 201 in the system include, but are not limited to, a data set storage or input device 202, a data extractor 204, a graphical visualization pool storage 206, a determining engine 208, a graphical visualization set storage 210 (which may be part of or separate from graphical visualization pool storage 206), a ranking engine 212 and a display generator 214. The components are typically software components, although it is appreciated that the components may also be formed by any other means known in the art. In one embodiment, data set storage or input device 202 and display generator 214 reside on the client device 102, and data extractor 204, graphical visualization pool storage 206, determining engine 208, graphical visualization set storage 210, and ranking engine 212 reside on the spreadsheet server 108. In another embodiment, all components reside on the spreadsheet server 108 or the spreadsheet server 108 is available to receive data from data storage or input device 202 and output data to the data storage or input device 202 for display. However, each component may reside at any location accessible on the network N. For example, data set storage or input device 202 may be a database that resides independent of all other components.

In one embodiment, the data sets are stored or directly input by a user in data storage or input device 202 for transformation into a graphical visualization. As part of the transformation process, the data is examined or extracted from the data set storage or input device 202 by data extractor 204. The data extractor 204 examines the data to identify data-types and to differentiate columns with different data-types. In combination with the results of the data set examined by the data extractor 204 and graphical visualizations stored in graphical visualization pool storage 206, the determining engine 208 analyzes and transforms the data set. The graphical visualizations having attributes suitable for the transformed data are selected and stored in the graphical visualization set storage 210. The set of graphical visualizations are ranked in ranking engine 212 and display generator 214 renders the graphical visualization for display. A more detailed explanation of the system is found below.

Figure 5:
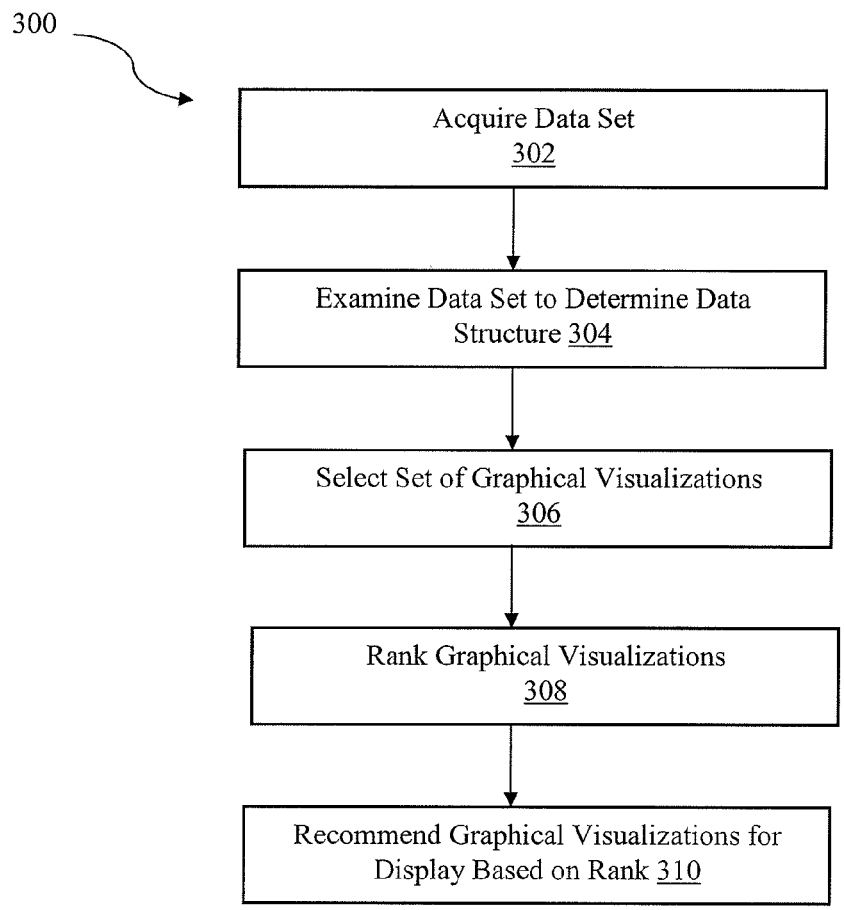
FIG. 5 illustrates an exemplary flow chart of generating graphical visualizations in accordance with the present invention.

FIG. 5 illustrates an exemplary flow chart of generating graphical visualizations in accordance with the present invention. In the exemplary method that follows, the spreadsheet server application 116 is primarily responsible for performing operations according to flow 300. It is appreciated, however, that these operations are not limited to being performed on the spreadsheet server application 116, but rather may be performed on any component in the system, such as client device 102, data server 104, or any other component accessible by the system. At 302, a data set (e.g. the contents of the spreadsheet) or multiple data sets are acquired by the spreadsheet server 108. As explained above, the data set may be received from data store 106, client device 102, by direct input from a user or any other location accessible by the system. In other embodiments, the data set may be collected from a third party, such as a business, a computer or any other database capable of storing information. Once the data set has been acquired and populated into the spreadsheet 110, the data set is examined to determine a data structure or data model corresponding to or representative of the data set, at 304. Then, at 306, a set of graphical visualizations are selected from a pool of graphical visualizations that are stored on the system 200. The pool of graphical visualizations represents, for example, any number of graphical visualizations that may be used to represent the contents of a spreadsheet (e.g. a data set) and which are stored and accessible by the system 200. The set of graphical visualizations represents a sub-set of the pool, but may also include all or none of the visualizations in the pool. That is, it is possible that the process of selecting includes selecting, for example, all, none or any number of graphical visualizations in the pool. The selected set of graphical visualizations is then ranked according to a variety of criteria at 308, and none (if no graphical visualizations are selected), one or more graphical visualizations are recommended to the user based on the ranking as representing the data set acquired from the spreadsheet 110, at 310. The recommendations may then be displayed on a user's client device 102. If only one recommendation is made (i.e. only one graphical visualization is selected), then ranking may not be required. If, on the other hand, more than one recommendation has been made, the spreadsheet server application 108 may provide the user at client device 102 with a list of graphical visualizations. For example, the list of recommendations provided may appear in an order according to the ranking, with the highest ranked graphical visualization appearing first in the list. A user may then select the preferred graphical visualization from the list to best represent that data set in the spreadsheet 110. It is appreciated that one or more graphical visualizations may be selected, generated and then displayed for the same data set. Moreover, multiple data sets (for example, data sets appearing in different "tabs" or "sheets" in a spreadsheet) may each be represented in a similar manner, thereby displaying a graphical visualization for each tab/sheet or displaying multiple graphical visualizations for each tab/sheet.

Figure 6:
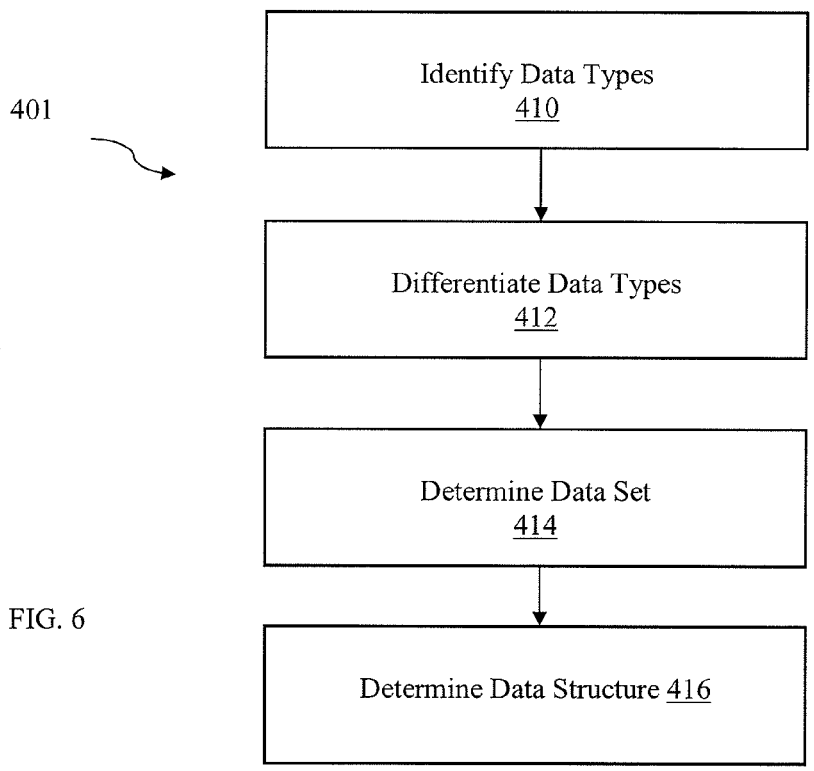
FIG. 6 illustrates an exemplary flow chart of examining data to determine a data structure in accordance with the present invention.

FIG. 6 illustrates an exemplary flow chart of examining data to determine a data structure in accordance with the present invention. As part of examining the data set to determine data structure, the spreadsheet server application 116 identifies data types at 410. Data types are identified for each column in the spreadsheet 110. In order to identify data types, the data in each column of the spreadsheet 110 is examined. The data is examined to extract information that identifies the type or category of data that populates a particular column. For example, if the data in a column appears as values [2009, 2010, 2011], these values may be identified and categorized as numbers. While correctly identified, the category selected may not provide enough information to generate a graphical visualization to adequately represent the data, and a graphical visualization such as a pie chart may be inadvertently selected. These numbers clearly represent calendar years and would be better displayed in a timeline format if the data can be categorized as such. Similarly, the values [35895444, 34545432] appear to be numbers, when in fact they represent social IDs. As such, they should be categorized as strings, not numbers. In another example, the values ["arad", "ako"] may appear as strings, but more precisely represent cities, which are well suited to be presented in map format. In each of these examples, the spreadsheet server application 116 is designed to examine the data set to identify the specific type of data appearing in each column of the spreadsheet 110. In order to accomplish this task, in addition to the techniques described above and further below, each column in the data set is examined to try an extract as much of the following information as possible: the primitive types of column values (for example, string, number, etc.); column labels (for example, "Salary," "GDP," "Income $"); value formatting (for example, "$," "km," etc.); known values (for example, "USA," "Nike," "2010," etc.); and custom properties attached to columns, such as column x holds the property "geo-countries." Once the information is extracted, the spreadsheet server application 116 can determine or assign the "type" or category of each column. For example, if a specific column includes information that is comprised of dollar signs ($) followed by a number, then the column type is determined or assigned to be numeric with units USD ($). It is appreciated that the type of information extracted from the data set is exemplary in nature. Any number of different types of information can be extracted from the data set, and the example provided is not intended to limit the scope of the invention to such embodiment. After identifying the data types of each column at 410, the spreadsheet server application 116 differentiates the data types of each column from one another at 412. The differentiated data types can be used to remove and rearrange columns of data in the spreadsheet 110, which allows the spreadsheet server application 116 to determine a new data set(s) using the identified data types and differentiated data types (at 414), as explained below with reference to FIG. 8. A data structure for each new data set is then determined at 416, as explained below with reference to FIG. 9. It is also appreciated that while the spreadsheet server application 116 is being used to examine and extract information in the embodiment described, any component or device accessible by the network may perform the operations. That is, operations are not limited to the spreadsheet server application 116. Moreover, the user may select a specific range or data and/or a specific visualization. Likewise, the selected range (or another range) may be selected and examined in a different way to provide alternative visualizations.

Figure 7:
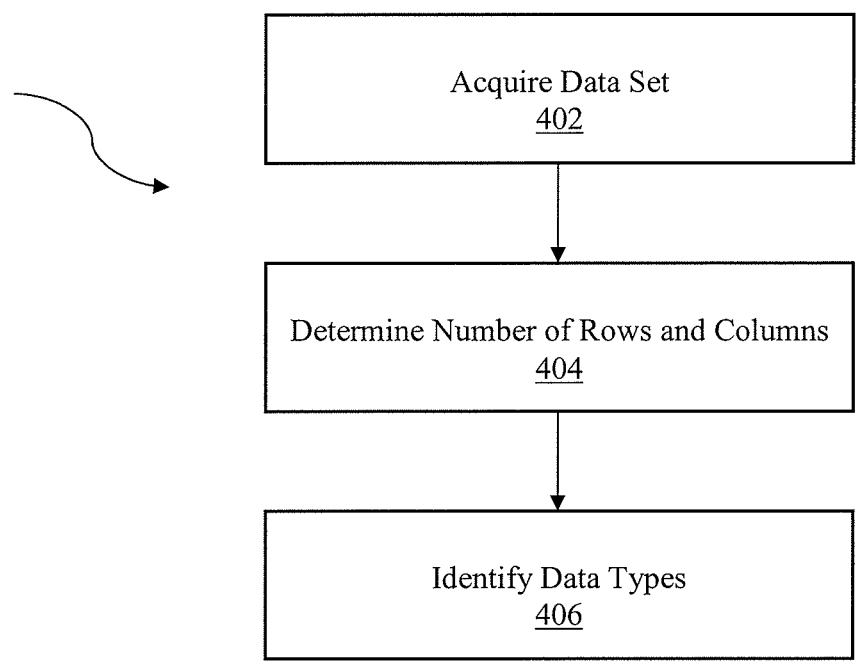
FIG. 7 illustrates an exemplary flow chart of determining a data structure in accordance with the present invention.

FIG. 7 illustrates an exemplary flow chart of examining data to determine a data structure in accordance with another embodiment of the present invention. According to flow 400, a data set (e.g. the contents of the spreadsheet) or multiple data sets are acquired by the spreadsheet server 108 at 402. As explained above, the data set may be received from data store 106, client device 102, by direct input from a user or any other location accessible by the system 200. In other embodiments, the data set may be collected from a third party, such as a business, a computer or any other database capable of storing information. Once the data set has been acquired and populated into the spreadsheet 110, the number of rows and columns in the spreadsheet 110 are determined at 404, and each column is assigned a "type" or category at 406. For example, a column may be assigned one of the following types: time, number, string, location, etc. It is appreciated that any number of "types" may exist, and the invention is not limited to those expressed in this embodiment (see, for example, FIG. 6 above, which describes further identification of data types). Upon classifying each column in the spreadsheet 110, and having determined the number of rows and columns, a data structure corresponding to the data set may be identified. That is, once the specific data set from the spreadsheet is selected, and the types of each column in the data set are determined, an algorithm examines, for example, a table list of column types (e.g, first column is "string," second column is "number," and third column is "number," etc.) and matches it to the data structures declared by all graphical visualizations in the plurality of graphical visualizations (e.g., bar chart—"string" column and then "number" columns). Data structures that match the current data set structure remain and their corresponding graphical visualizations become candidates for rendering the data set.

Figure 8:
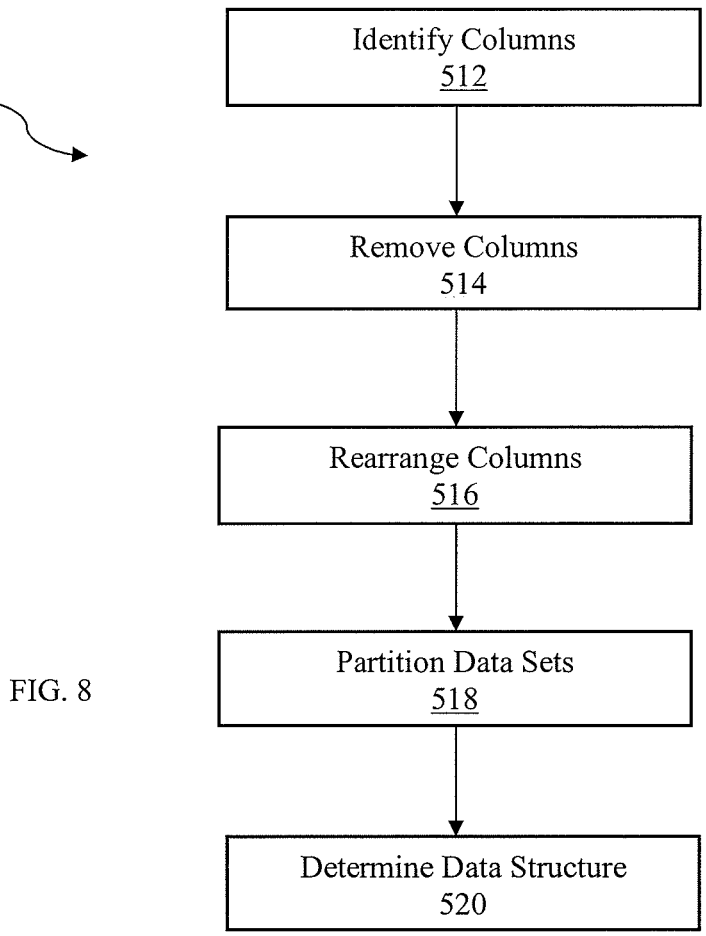
FIG. 8 illustrates an exemplary flow chart of determining a data set in accordance with the invention.
Figures 11A, 11B, 11C, 11D:
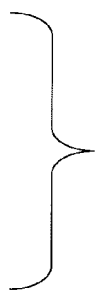
FIGS. 11A-11D illustrate an exemplary embodiment of the flow chart in FIG. 8.

FIG. 8 illustrates an exemplary flow chart of determining a data set in accordance with the invention. For each available graphical visualization, and after each column has been identified and associated with a type at 512, the spreadsheet server application 116 further reduces the data set by removing non-relevant columns, rearranging columns in the spreadsheet 110 and partitioning the data set. More specifically, the spreadsheet server application 116 removes column(s) in the spreadsheet 110 based on the differentiated data types determined at 412. This action is performed for each of the graphical visualizations available, although may be limited to any number of graphical visualizations as determined by the spreadsheet server application 116, user or otherwise. Each of the graphical visualizations has attributes or an "expected" data set that represents, fits or matches the type (e.g. column graph, bar graph, pie chart, etc.) of graphical visualization. Each graphical visualization may be mapped to an expected data set, group of expected data sets, attributes or any combination thereof. The data may be stored as a table or in any other form known to the skilled artisan. For example, a column-type graph may have an expected data set where the first column is a label and subsequent columns are numeric. In an exemplary spreadsheet, four columns (columns A, B, C and D) may exist in which columns A and B are determined to be a numeric-type, column C is an address-type and column D is a label-type. In this example, column C is differentiated from columns A and B since an address-type does not correspond or is not well represented (does not fit attributes of the graphical visualization) in a column-type graph (addresses are not part of the expected data set or an attribute suitable for the graphical visualization). Column C is then removed from the spreadsheet. Column D is also differentiated from columns A and B since they are different data types (numeric versus labels). However, since a label is part of the expected data set (or an attribute suitable for the graphical visualization), and labels can be represented in column-type graphs, it is not removed. If no differentiated data types exist, then no columns are removed. Once the appropriate columns have been removed, the columns are rearranged such that the columns match the expected data set (or attributes), at 516. For example, each graphical visualization (in this example, a column-type graph) has an expected data set (e.g. a data set or attributes arranged in a particular order that matches or substantially matches the graphical visualization). Since the expected data set for a column-type graph "expects" a label to be the first column, column D is moved (rearranged) to be the first column in the spreadsheet 110, where it was previously last in the spreadsheet. The rearranged order therefore appears as column D, column A and column B (column C having been removed). The data set is then partitioned into multiple data sets at 518, where each set has columns with similar data types, and a data structure for each data set is determined at 520. In this example, the data set is not partitioned since all of the columns can be represented in a column-type graph. However, an example of data set partitioning is described below with reference to another example (FIG. 11D). It is appreciated that the above described example is not intended to limit the scope of the invention, but is merely representative of one implementation.

Figure 9:
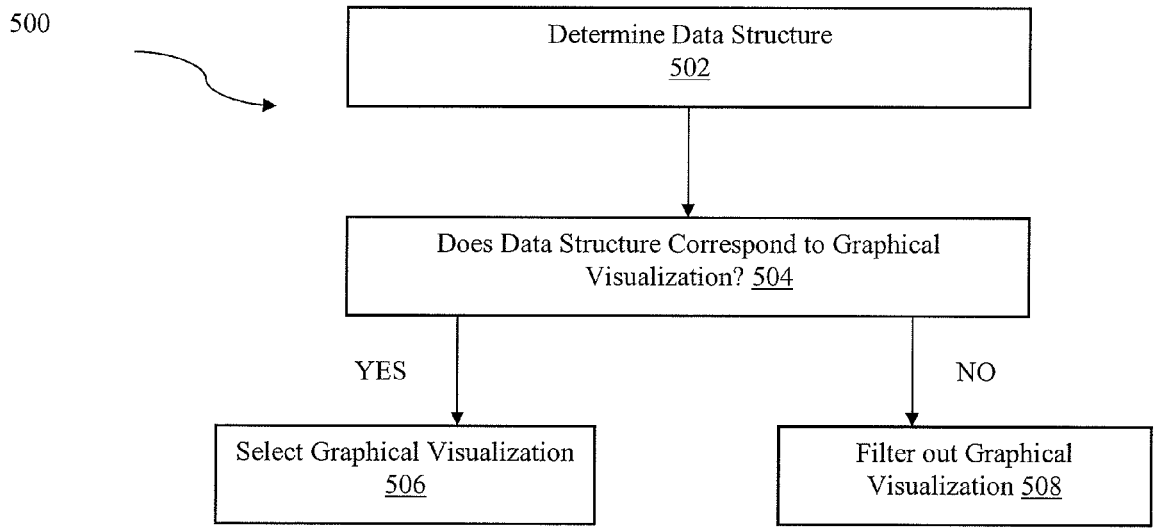
FIG. 9 illustrates an exemplary flow chart of selecting a set of graphical visualizations in accordance with the invention.

FIG. 9 illustrates an exemplary flow chart of selecting a set of graphical visualizations in accordance with the invention. In accordance with flow 500, upon determining a data structure corresponding to the data set at 502, as described with respect to FIGS. 6 and 7, the spreadsheet server application 116 examines the pool of graphical visualizations to determine whether any one or more of the graphical visualizations in the pool correspond to the determined data structure (504). The pool of graphical visualizations may be stored, for example, in data store 106, spreadsheet server 108, client device 102 or any other component accessible on the system 200 capable of storing data. When examining the pool of graphical visualizations, if the spreadsheet server application 116 determines that the data structure does not correspond or match any one of the graphical visualizations, that specific graphical visualization is filtered out (e.g. discarded from the examination), at 508. If, on the other hand, the spreadsheet server application 116 determines that the data structure corresponds to or matches any one of the graphical visualizations, that specific graphical visualization is selected as a potential recommendation and placed as part of a set of graphical visualizations, at 506.

Figure 10:
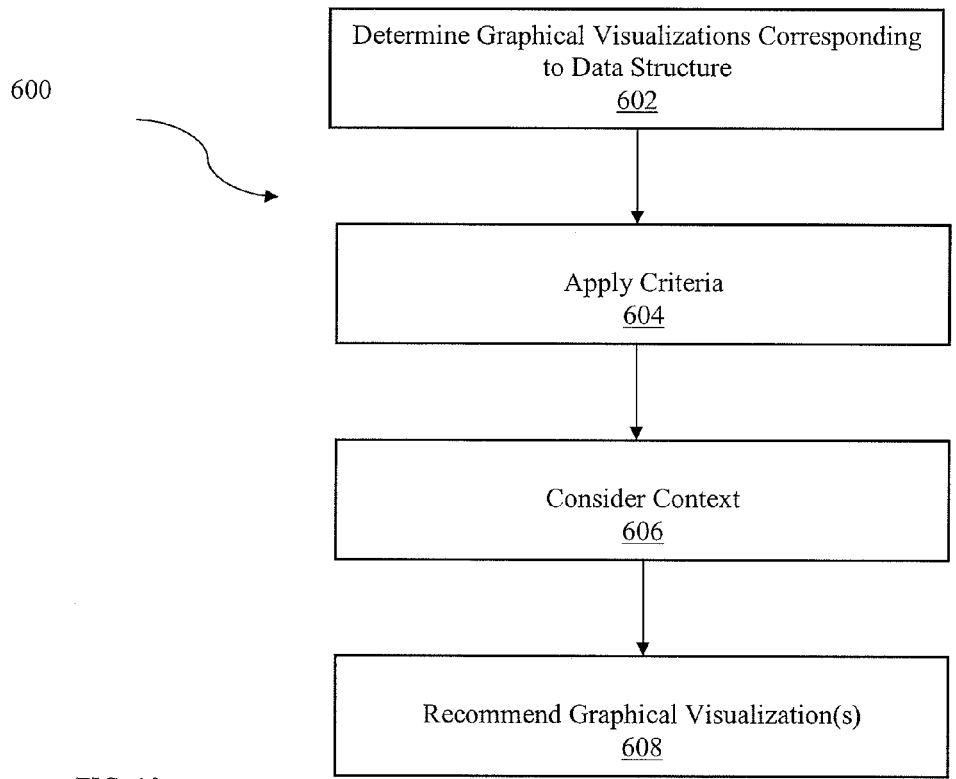
FIG. 10 illustrates an exemplary flow diagram of ranking a graphical visualization in accordance with the present invention.

FIG. 10 illustrates an exemplary flow diagram of ranking a graphical visualization in accordance with the present invention. In accordance with flow 600, the graphical visualizations corresponding to the data structure are determined at 602, as previously described with respect to FIG. 9. In order to rank each graphical visualization in the set of graphical visualizations, the spreadsheet server application 116 applies various criteria (604), and considers the context within which the graphical visualization is going to be used (606). Criteria related to the graphical visualization and corresponding data set are observed for "fitness" and "coolness" measures. Fitness and coolness may be any measure of a graphical visualization, which measures can be coded into the system in any manner desirable. For example, fitness determines whether a graphical visualization that may be compatible with the data range also has any signals or indications from the data that the graphical visualization is or is not a fit. As an example, an annotated time line might only have a "medium" affinity with a data range which does not include annotated text, and an area chart would have a "low" affinity with a data range that includes negative values. In these examples, the fitness rank may be lowered from high ranking to a medium or low ranking since the affinities are less than optimal. Another measure is coolness. Coolness determines the expressive power or aesthetic attractiveness of the graphical visualization. For example, if a graphical visualization is generally more powerful or useful than other graphical visualizations (for example, because a graphical visualization is more often used), the more powerful graphical visualizations will have a higher ranking. Next, the spreadsheet server application 116 considers the context within which the graphical visualization is going to be used. For example, a presentation before the board of directors for a university may prefer a more conservative visualization, than the same presentation before an audience at a comedy show that prefers a comical visualization. Imagine not having to recreate the entire presentation to suit different audiences, but rather simply having to "explain" the context within which the presentation is going to be used. To accomplish such a distinction, the following qualities may be considered: visualization popularity, previous visualizations used, visualizations already used in the same context, visualizations already used for the current data set, visualizations that would generate a unique insight, etc. Upon application of the criteria and context, the graphical visualizations are ranked, and recommendations are made as to which graphical visualization or visualizations represent the data set, at 608. It is appreciated that any number of and/or combination of criteria and contexts may be used and applied in order to arrive at a particular ranking, and the invention is not limited to the embodiments described herein.

Figure 12:
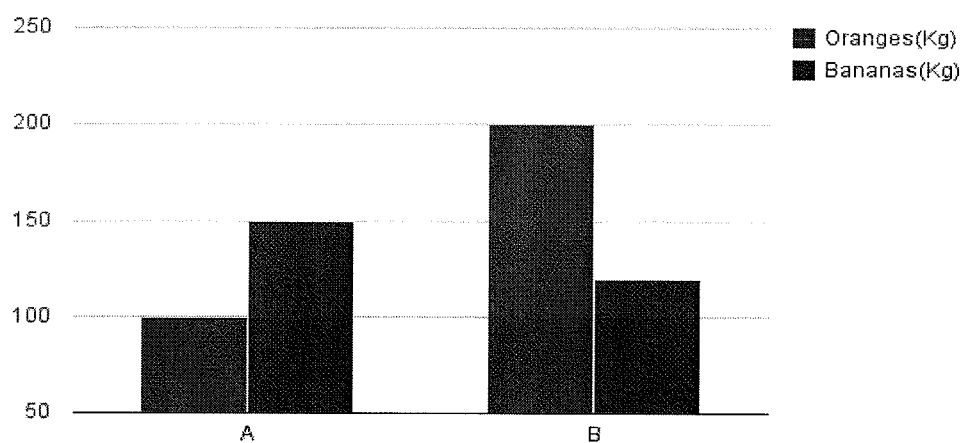
FIG. 12 illustrates an exemplary graphical visualization of a partitioned data set in accordance with FIG. 11D.
Figure 13:
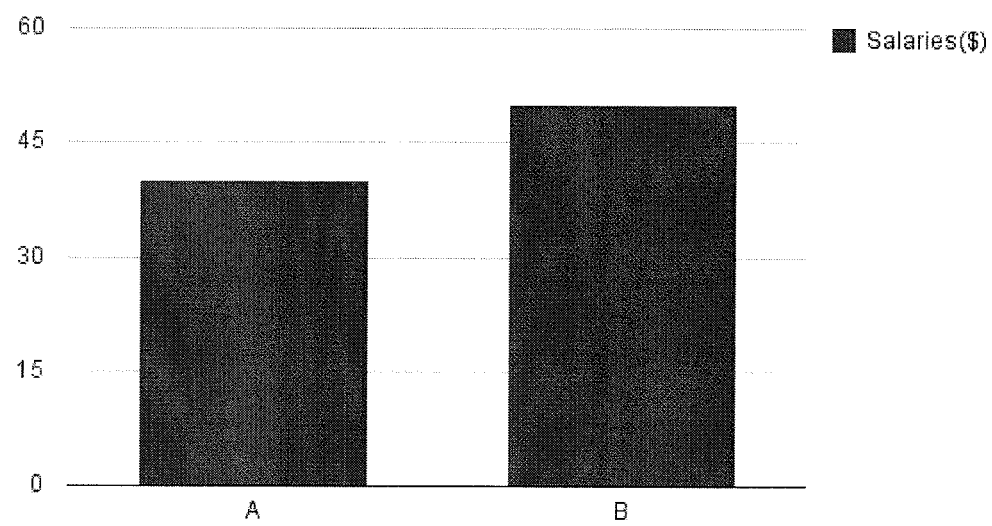
FIG. 13 illustrates an exemplary graphical visualization of a partitioned data set in accordance with FIG. 11D.

FIGS. 11A-11D illustrate an exemplary embodiment of the flow chart in FIG. 8. FIG. 11A illustrates an exemplary spreadsheet 110 that has been populated with a data set. As shown in the figure, the spreadsheet 110 has five (5) columns, each with labels in the first row and corresponding data in each column. As explained above with reference to FIG. 8, a graphical visualization (e.g. column graph, bar graph, pie chart, etc.) has an expected data set or attributes that represent corresponding graphical visualizations. For example, a column graph is expecting a data set where the first column includes labels and subsequent columns include numeric values. When applying as an example the data set in the spreadsheet of FIG. 11A, the data set includes five columns (Oranges, Salaries, Bananas, Department and Address), with each column including various data. However, given the expected data set for a column graph, the data in its current format cannot be used directly to visualize the data set. However, the data can be identified using the following transformations to form a new data set that may be used to visualize the data. First, each of the columns in the spreadsheet 110 are identified. In this example, the columns are identified to include the follow types: column 1: number/kg; column 2, number/$; column 3: number/kg; column 4: string and column 5: string/geography. FIG. 11B illustrates the exemplary spreadsheet 110 after column-type has been identified for each column, and column(s) have been removed where the identified column-type is not relevant for the corresponding graphical visualization (in this case, the column graph). For example, the "Address" column (column 5) includes geographical data that is not included in the expected data set for a column graph, and which cannot be graphically visualized in the column format. Hence, the address column is removed from the spreadsheet 110, as illustrated. Next, as shown in FIG. 11C, columns are rearranged (moved) into a different order, such that the revised order better conforms with the expected data set for the corresponding graphical visualization. The expected data set for a column graph, as explained above, has a first column-type that is a label, followed by column-types that are numeric. Since the first column is "expected" to be a label, the "Department" column (label column) is moved to the first column, as illustrated. Additionally, the rearranged spreadsheet 110 (FIG. 11C) may be further partitioned into new and separate data sets, such that each data set is representative of a corresponding graphical visualization. For example, as shown in FIG. 11D, the rearranged data set in FIG. 11C is further partitioned into two data sets since the data set includes different types and cannot be easily compared for rendering in a column graph. That is, numbers to measure weight (kg) is not easily compared to numbers representing cost ($). Therefore, one of the data sets is partitioned to include the department, oranges (kg) and bananas (kg) columns, and the other of the data sets is partitioned to include the department and salaries ($) columns, as illustrated in the figure. FIG. 12 illustrates an exemplary graphical visualization of a partitioned data set in accordance with FIG. 11D, where the horizontal axis includes A, B representative of the departments, the vertical axis includes numbers representative of weight (kg) and the bars represent a corresponding weight for oranges and bananas in each department. Similarly, FIG. 13 illustrates an exemplary graphical visualization of another partitioned data set in accordance with FIG. 11D. The horizontal axis includes A, B representative of the department, the vertical axis includes number representative of salaries ($) and the bars represent corresponding salaries for each department.

Figure 14A:
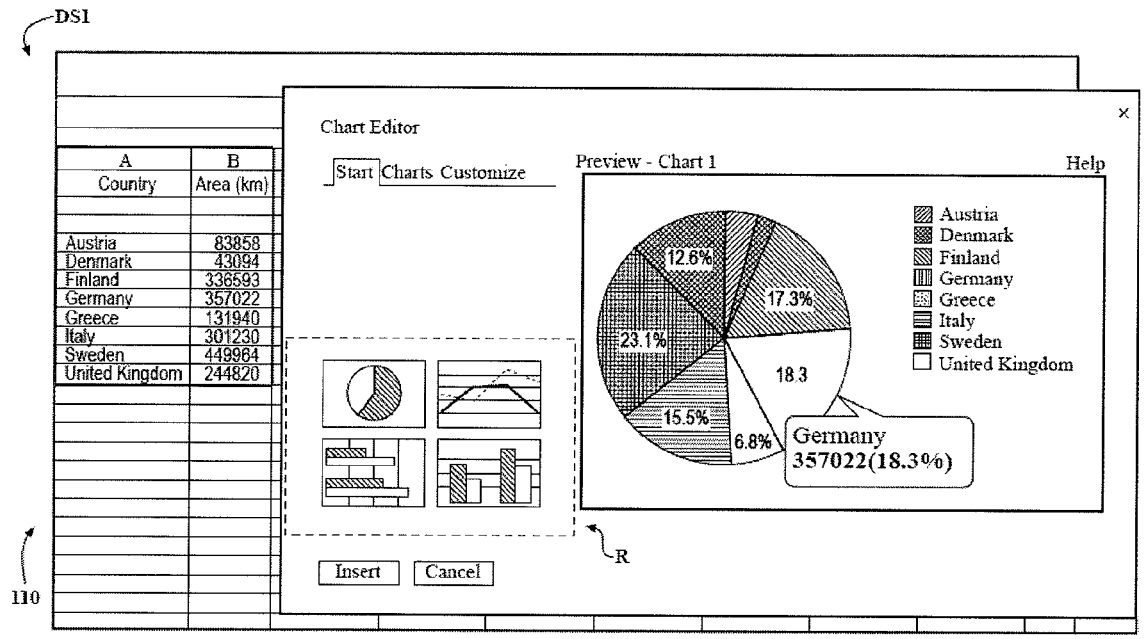
FIGS. 14A-14C illustrate an exemplary display of graphical visualizations in accordance with the present invention.
Figure 14B:
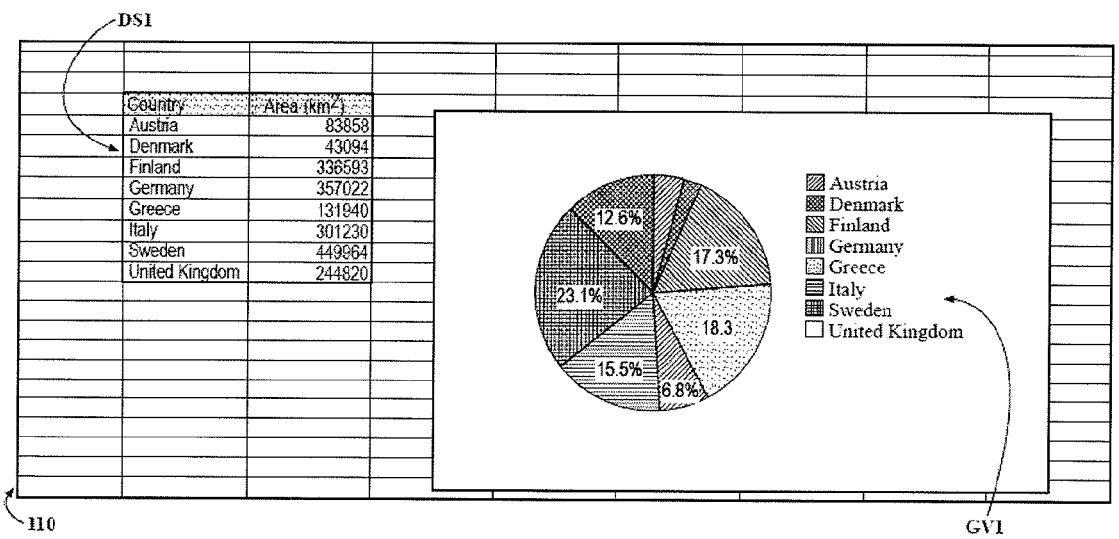
Figure 14C:
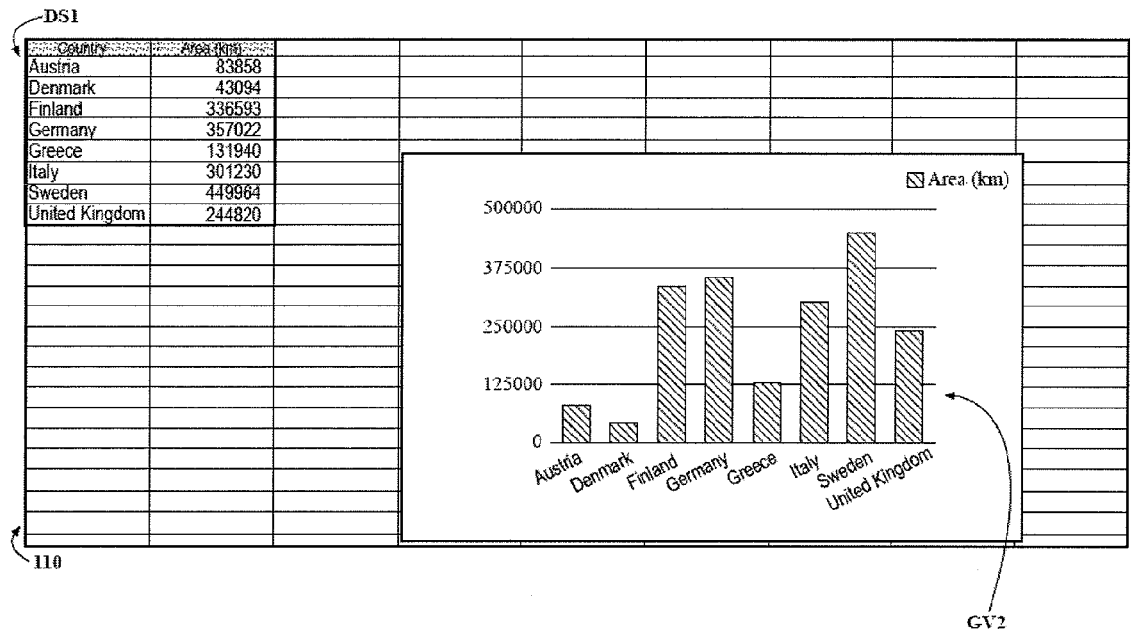

FIGS. 14A-14C illustrate an exemplary display of graphical visualizations in accordance with the present invention. Operation will now be described with reference to the figures. With reference to FIG. 14A, a display shows an exemplary spreadsheet 110, data set DS1 and recommended graphical visualizations R. In this example, spreadsheet 110 is populated (using any of the aforementioned techniques) with contents in twelve rows 1-12 and two columns A and B after having been acquired. The data set is examined to determine a data structure, and a set of graphical visualizations are selected, ranked and then generated for display. In the example, recommendations R comprise the selected, ranked and generated graphical visualizations. From the displayed and recommended graphical visualizations, a user may select (or the system may automatically select) one or more of the graphical visualizations R for rendering into the spreadsheet 110. As shown in FIG. 14B, a pie chart GV1 has been selected for rendering. In an alternative embodiment of FIG. 14C, a bar graph GV2 has been selected for rendering.

Figure 15:
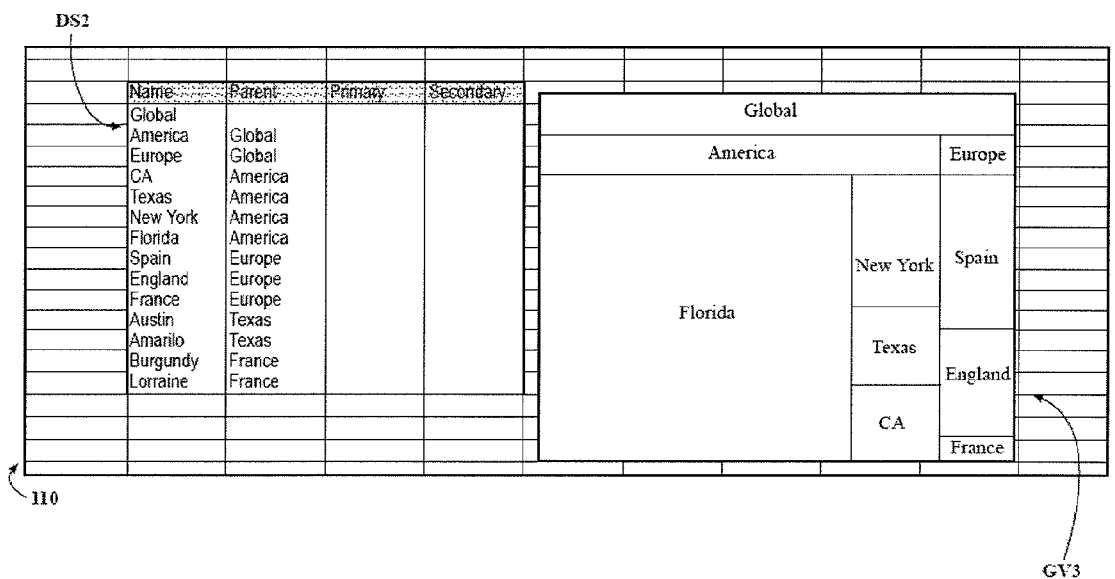
FIG. 15 illustrates an exemplary embodiment of a spreadsheet with graphical visualization in accordance with the present invention.
Figure 16:
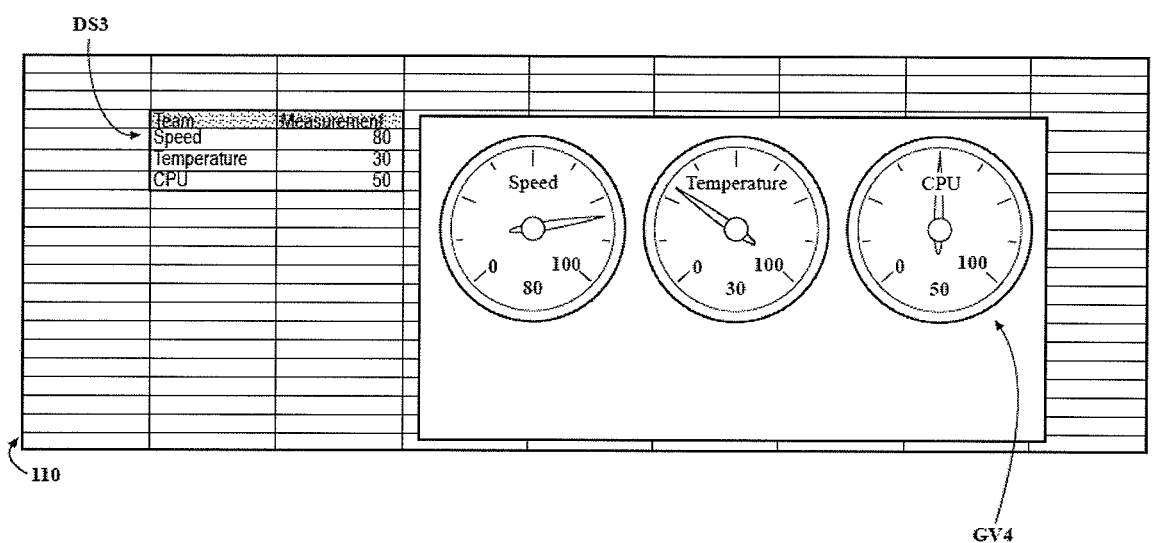
FIG. 16 illustrates another exemplary embodiment of a spreadsheet with graphical visualization in accordance with the present invention.

FIGS. 15 and 16 illustrate exemplary embodiments of a spreadsheet with graphical visualizations in accordance with the present invention. In exemplary FIG. 15, spreadsheet 110 has a data set DS2 with columns labeled Name, Parent, Primary and Secondary. The data set has been rendered as a graphical visualization GV3 which represents the data set. Similarly, in exemplary FIG. 16, spreadsheet 110 has a data set DS3 with columns labeled as Team and Measurement. The data set has been rendered as a graphical visualization GV4 which represents the data set. It is appreciated that the displayed spreadsheets, data sets and graphical visualizations are merely exemplary in nature, and not intended to limit the scope of the invention to the illustrated embodiments.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method to generate a graphical visualization in a web-based document application, comprising:
   identifying a data type for each column in a data table having a first set of data;
   differentiating the data types between each of the columns in the data table;
   determining a second data set derived from the first data set and corresponding to at least one graphical visualization with an expected data set in a plurality of graphical visualizations, and when the data type for a respective column is not relevant to the expected data set of the at least one graphical visualization, removing the respective column in the data table;
   selecting a set of graphical visualizations comprised of each graphical visualization having the expected data set suitable for the second data set;
   ranking, based on a criteria and the second data set, each graphical visualization in the set of graphical visualizations to graphically represent the second data set;
   generating at least one graphical visualization from the set of graphical visualizations for display based on the ranking; and
   determining each of the second data sets by:
      rearranging at least one of the columns to correspond with a respective graphical visualization in the set of graphical visualizations, and
      partitioning the columns in the data table to form separate partitioned second data sets, each set having columns with similar data types; and
   examining the partitioned second data sets to determine respective data structures.

2. The computer-implemented method according to claim 1, wherein identification of the data type is determined by analyzing information from each of the columns in the data table, the extracted information including at least one of primitive types of column values, column labels, value formatting, known values and customized properties.

3. The computer-implemented method according to claim 1, further comprising:
   determining whether each graphical visualization in the set of graphical visualizations corresponds to the data structure;
   selecting each graphical visualization in the set of graphical visualizations that is representative of the data structure; and
   discarding each graphical visualization in the set of graphical visualizations that is not representative of the data structure.

4. The computer-implemented method according to claim 3, further comprising:

applying the criteria to determine at least one of the compatibility and aesthetic attractiveness of each selected graphical visualization to a range of data in the partitioned second data sets;

determining a context for each selected graphical visualization in the set of graphical visualizations; and ranking each selected graphical visualization in the set of graphical visualizations according to at least one of the criteria and context.

5. The computer-implemented method according to claim 4, wherein the context includes at least one of visualization popularity, previously used visualizations, visualization used in a same context, visualizations used for a same data set and visualizations generating insight.

6. The computer-implemented method according to claim 1, wherein the at least one generated graphical visualization is the highest ranking.

7. The computer-implemented method according to claim 1, wherein the web-based document application resides on a web-based server that communicates via a network with a client device.

8. The computer-implemented method according to claim 7, wherein the web-based document and graphical visualizations are displayed on the client device via a web page.

9. The computer-implemented method according to claim 7, wherein the web-based document is populated with the first data set acquired from one of a storage device, the client device and the web-based server.

10. The computer-implemented method according to claim 1, wherein the web-based document is a spreadsheet.

11. The computer-implemented method according to claim 10, further comprising:

acquiring the first data set into the data table from a database;

examining data from the first data set to determine a data structure; and calculating a number of rows and columns in the data table which includes the first data set.

12. A non-transitory computer readable medium storing instructions to generate a graphical visualization in a web-based document application, the instructions when executed by a processor, comprising:

identifying a data type for each column in a data table having a first set of data;

differentiating the data types between each of the columns in the data table;

determining a second data set derived from the first data set and corresponding to at least one graphical visualization with an expected data set in a plurality of graphical visualizations, and when the data type for a respective column is not relevant to the expected data set of the at least one graphical visualization, removing the respective column in the data table;

selecting a set of graphical visualizations comprised of each graphical visualization having the expected data set suitable for the second data set;

ranking, based on a criteria and the second data set, each graphical visualization in the set of graphical visualizations to graphically represent the second data set;

generating at least one graphical visualization from the set of graphical visualizations for display based on the ranking; and determining each of the second data sets by:

rearranging at least one of the columns to correspond with a respective graphical visualization in the set of graphical visualizations, and partitioning the columns in the data table to form separate partitioned second data sets, each set having columns with similar data types; and examining the partitioned second data sets to determine respective data structures.

13. The non-transitory computer readable medium according to claim 12, wherein identification of the data type is determined by analyzing information from each of the columns in the data table, the extracted information including at least one of primitive types of column values, column labels, value formatting, known values and customized properties.

14. The non-transitory computer readable medium according to claim 12, further comprising:

determining whether each graphical visualization in the set of graphical visualizations corresponds to the data structure;

selecting each graphical visualization in the set of graphical visualizations that is representative of the data structure; and discarding each graphical visualization in the set of graphical visualizations that is not representative of the data structure.

15. The non-transitory computer readable medium according to claim 14, further comprising:

applying the criteria to determine at least one of the compatibility and aesthetic attractiveness of each selected graphical visualization to a range of data in the partitioned second data sets;

determining a context for each selected graphical visualization in the set of graphical visualizations; and ranking each selected graphical visualization in the set of graphical visualizations according to at least one of the criteria and context.

16. The non-transitory computer readable medium according to claim 15, wherein the context includes at least one of visualization popularity, previously used visualizations, visualization used in a same context, visualizations used for a same data set and visualizations generating insight.

17. The non-transitory computer readable medium according to claim 12, wherein the at least one generated graphical visualization is the highest ranking.

18. The non-transitory computer readable medium according to claim 12, wherein the web-based document application resides on a web-based server that communicates via a network with a client device.

19. The non-transitory computer readable medium according to claim 18, wherein the web-based document and graphical visualizations are displayed on the client device via a web page.

20. The non-transitory computer readable medium according to claim 18, wherein the web-based document is populated with the first data set acquired from one of a storage device, the client device and the web-based server.

21. The non-transitory computer readable medium according to claim 12, wherein the web-based document is a spreadsheet.

22. A computer-implemented server to generate a graphical visualization in a web-based document application, comprising:

a memory storing an application; and at least one processor executing the application to:

identify a data type for each column in a data table having a first set of data;

differentiate the data types between each of the columns in the data table;

determine a second data set derived from the first data set and corresponding to at least one graphical visualization with an expected data set in a plurality of graphical visualizations, and when the data type for a respective column is not relevant to the expected data set of the at least one graphical visualization, remove the respective column in the data table;

select a set of graphical visualizations comprised of each graphical visualization having the expected data set suitable for the second data set;

rank, based on criteria and the second data set, each graphical visualization in the set of graphical visualizations to graphically represent the second data set;

generate at least one graphical visualization from the set of graphical visualizations for display based on the ranking; and determine each of the second data sets by:
rearranging at least one of the columns to correspond with a respective graphical visualization in the set of graphical visualizations, and partitioning the columns in the data table to form separate partitioned second data sets, each set having columns with similar data types; and examine the partitioned second data sets to determine respective data structures.

23. The computer-implemented server according to claim 22, wherein the server is connected to at least one client device via a network.

24. The computer-implemented server according to claim 23, wherein the spreadsheet and graphical visualizations are displayed on the client device via a web page.

25. The computer-implemented server according to claim 22, wherein the processor further executes the application to:
determine whether each graphical visualization in the set of graphical visualizations corresponds to the data structure;

select each graphical visualization in the set of graphical visualizations that is representative of the data structure; and discard each graphical visualization in the set of graphical visualizations that is not representative of the data structure.

26. The computer-implements server according to claim 25, wherein the processor further executes the application to:
apply the criteria to determine at least one of the compatibility and aesthetic attractiveness of each selected graphical visualization to a range of data in the partitioned second data sets;

determine a context for each selected graphical visualization in the set of graphical visualizations; and rank each selected graphical visualization in the set of graphical visualizations according to at least one of the criteria and context.

* * * * *